US008726221B2

(12) United States Patent
Teoh et al.

(10) Patent No.: US 8,726,221 B2
(45) Date of Patent: May 13, 2014

(54) TOPOLOGY DENSITY AWARE FLOW (TDAF)

(75) Inventors: Edward Kah Ching Teoh, San Jose, CA (US); Ushasree Katakamsetty, Singapore (SG); Chiu Wing Hui, Singapore (SG)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/527,196

(22) Filed: Jun. 19, 2012

(65) Prior Publication Data
US 2013/0339916 A1    Dec. 19, 2013

(51) Int. Cl.
*G06F 17/50*    (2006.01)
(52) U.S. Cl.
USPC ............................ 716/135; 716/139
(58) Field of Classification Search
USPC ................... 716/132, 135, 138, 139
See application file for complete search history.

(56) References Cited

U.S. PATENT DOCUMENTS

| 7,201,637 | B2* | 4/2007 | Eschbach et al. | 451/28 |
| 2005/0097493 | A1* | 5/2005 | Monthie et al. | 716/11 |
| 2008/0171433 | A1* | 7/2008 | Huang et al. | 438/637 |
| 2008/0216027 | A1* | 9/2008 | White et al. | 716/4 |
| 2009/0307638 | A1* | 12/2009 | McConaghy | 716/4 |
| 2013/0121055 | A1* | 5/2013 | Huang et al. | 365/72 |

* cited by examiner

*Primary Examiner* — Vuthe Siek
(74) *Attorney, Agent, or Firm* — Ditthavong Mori & Steiner, P.C.

(57) ABSTRACT

A method for selecting and placing of an IP block in a SOC design based on a topology and/or a density of the SOC design is disclosed. Embodiments include: displaying a user interface; causing, at least in part, a presentation in the user interface of a topology and density view of a SOC design that includes an IP block; and modifying, prior to a tape-out of the SOC design, topology and/or density transition for the IP block in the SOC design based on the presentation.

17 Claims, 4 Drawing Sheets

TOPOLOGY DENSITY AWARE FLOW (TDAF)

TECHNICAL FIELD

The present disclosure relates to selection and placement of a physical block of intellectual property (an IP block) in a system on chip (SOC) design based on a surface height topology and/or material density of the SOC design. The present disclosure is particularly applicable to placement and selection of an IP block based on surface height topology and/or material density before tape-out of the SOC design in 40 nanometer (nm) technology nodes and beyond.

BACKGROUND blocks such as memory and IO have high material densities, which, along with neighboring circuits, have a significant impact on chemical mechanical polishing (CMP). Placement and routing (P&R) tools, however, are unaware of the topology or material density or line width structures inside the IP blocks, as only pin information is provided for chip designers and the P&R tools. Therefore, IP block material thickness, material density, topology, and the resulting CMP effects on a manufacturability of an SOC design, are only considered after tape-out. However, such CMP effects are becoming more prominent for 40 nm technology nodes and beyond. For instance, CMP effects due to accumulated topology caused by a high material density of metal structures in a wide area, may cause lithography and etch process issues. In addition, CMP effects may be caused by, for instance, a wide topology variation with a high standard of deviation from intra layer wide-width power lines. Thus, SOC designs or layouts may need to be modified after tape-out to address topology and CMP effects which were not considered during prior design steps. As such, manufacturers face significant challenges for reducing topology and CMP effects in various stages of design to improve a manufacturability of the SOC design.

FIG. 1 schematically illustrates an exemplary SOC design without a representation of an IP block topology before tape-out. As shown, the SOC design includes a placement 101 of adjacent IP blocks with a steep density increase, another placement 103 of adjacent IP blocks with a steep density increase, placement 105 of an IP block with a steep density increase, a placement 107 of an IP block requiring a thick copper (Cu) route, and a placement 109 of IP blocks having an inefficient floor plan. The placement 101 of adjacent IP blocks has a steep density increase because adjacent IP blocks include a low material density IP block 111, next to a high material density IP block 113. However, since blocks 111 and 113 are followed by a medium material density IP block 115, a more gradual density transition could be accomplished by placing the medium material density IP block 115 between the IP blocks 111 and 113. Similarly, the placement 103 of adjacent low and high material density IP blocks has a steep density transition. However, a wide width power preroute surrounding a high material density IP block 117 could make the density transition more gradual. In addition, the placement 105 of a high material density IP block, for example a memory, requires a steep density increase from lacking spacing to allow for a gradual density increase. Additionally, the placement 107 of a high material density IP block, for example a memory, requires a thick Cu route from being adjacent to an IP block 119. However, surrounding the placement 107 with a wide width power preroute could minimize the Cu thickness and increase a Cu thickness planarity of the SOC design. Further, the placement 109 of IP blocks is inefficient because the IP blocks may be orientated in a manner that uses less space in the layout. Additionally, a high material density block 119 may unnecessarily increase topology variation when another IP block capable of performing a similar function and having lower density is available. That is, SOC designs traditionally have a steep density increase and a selection of high material density IP blocks, resulting in an SOC design with significant topology variations and CMP effects.

A need therefore exists for a methodology enabling a representation of an IP block topology before tape-out of an SOC design that enables reduced topology and CMP effects, and the resulting designs.

SUMMARY

An aspect of the present disclosure is a user interface representing an IP block topology in an SOC design.

Another aspect of the present disclosure is a circuit implementing an IP block topology modified prior to a tape-out.

Yet another aspect of the present disclosure is a method for representing an IP block topology in an SOC design.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: displaying a user interface; causing, at least in part, a presentation in the user interface of a topology and density view of a SOC design that includes an IP block; and modifying, prior to a tape-out of the SOC design, topology and/or density transition for the IP block in the SOC design based on the presentation.

Some aspects include modifying during a floor planning design step, a placement and routing design step, an SOC design step, a top level fill design step, or a combination thereof. Other aspects include indicating in a presentation a high material density for an IP block, and modifying by surrounding the IP block with a wide width power preroute, to reduce the density transition between the IP block and another IP block or a metal route. Additional aspects include indicating in a presentation a low material density for an IP block and a high material density for a memory or another IP block of the SOC design, and modifying by surrounding the memory or the another IP block with a wide width power preroute. Further aspects include indicating in a presentation a low material density for an IP block, a high material density for a second IP block of a SOC design, adjacent the IP block, and an intermediate density for a third IP block of the SOC design adjacent the second IP block and remote from the IP block, and modifying by placing the third IP block between the IP block and the second IP block, to reduce the density transition between the IP block and the second IP block. Some aspects include a method wherein a high material density exceeds a density of 60%, and a low material density is less than a density of 25%, wherein IP blocks within 100 microns (μm) from each other are adjacent, and wherein surface height topology height differences between the IP block and adjacent IP blocks are within 150 Å. Additional aspects include a method wherein an IP block has a density and a surface height, the method further comprising: indicating in a presentation another IP block with another density and another surface height configured to perform a similar function to the IP block; and modifying by selecting, prior to a tape-out of the SOC design, the another IP block for the SOC design to perform the function when the another density is less than the density of the IP block, when the another surface height is less than the surface height of the IP block, or a combination thereof. Further aspects include indicating in a presentation a first metal route for an IP block and a second metal route, different from the first, for a second IP block adjacent the IP block, and modifying by forming a dummy fill pattern between the IP block and the second IP block to increase a metal surface planarity between the IP block and the second IP block. Other aspects include a method wherein the metal is Cu or aluminum (Al). Further aspects include indicating in a presentation a high material density for an IP block and a high material density for a second IP block of an SOC design adjacent the IP block, and placing the IP block and the second IP block edge to edge or side to side during a floor planning step.

Another aspect of the present disclosure is a circuit including: a plurality of IP blocks of an SOC design, each having a density, a surface height, and tile coordinates, wherein a layout of the IP blocks is modified, prior to a tape-out of the SOC design, based on the density, the surface height, or a combination thereof; and a plurality of metal routes, each having a thickness, wherein the plurality of metal routes connect the plurality of IP blocks.

Aspects include a circuit wherein one or more preroute areas are designated in the layout, prior to a tape-out of the SOC design, for a placement of one or more of the plurality of metal routes, wherein the placement of the one or more of the plurality of metal routes spreads the plurality of metal routes or increases a metal thickness planarity of the SOC design. Additional aspects include a circuit wherein each of a plurality of IP blocks is enclosed by a corresponding preroute area of one or more preroute areas, and wherein the corresponding preroute area has a size based on a density of the corresponding IP block the preroute area encloses. Further aspects include a circuit wherein a metal is Cu or Al. Other aspects include a circuit wherein a modified layout places IP blocks having a high material density adjacent to no other IP blocks having a low material density, and places IP blocks having a low material density adjacent to no other IP blocks having a high material density. Some aspects include a circuit wherein a modified layout places IP blocks having an intermittent density between an IP block having a low material density and an IP block having a high material density. Additional aspects include a circuit wherein IP blocks with a high material density have a density exceeding 60%, IP blocks with a low material density have a density less than 25%, IP blocks with an intermediate density have a density between 25% and 60%, wherein IP blocks within 100 µm from each other are adjacent, and wherein surface height topology height differences between adjacent IP blocks are within 150 Å.

Another aspect of the present disclosure is a method including: determining an SOC design with a plurality of IP blocks, each having a density, a surface height, and tile coordinates, and a plurality of Cu routes connecting the plurality of IP blocks, each having a thickness; modifying, prior to a tape-out of the SOC design, a layout of the plurality of IP blocks in the SOC design to have IP blocks with a density greater than 60% adjacent to no other IP blocks having a density less than 25%, and a placement of the plurality of IP blocks in the SOC design to have IP blocks with a density less than 25% adjacent to no other IP blocks having a density greater than 60%, wherein IP blocks within 100 µm from each other are adjacent, and wherein surface topology height differences between adjacent IP blocks are within 150 Å; and designating, prior to a tape-out of the SOC design, an area around each of the plurality of IP blocks as a corresponding preroute area for a placement of one or more of the plurality of Cu routes, wherein the placement of the one or more of the plurality of Cu routes increases a Cu thickness planarity of the SOC design.

Aspects include determining a first IP block of the plurality of IP blocks configured to perform a function and at least one other IP block configured to perform the same function, and selecting, prior to a tape-out of the SOC design, an IP block of the at least one other IP block having a lower density or a lower surface height than the first IP block. Other aspects include a method wherein a corresponding preroute area has a size based on a density of a corresponding IP block the preroute area encloses.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the current problem of topology and CMP effects attendant upon designing SOCs without consideration of structure density, thickness, and placement efficiency. The present disclosure addresses and solves such problems, for instance by, inter alia, representing IP block topology before tape-out of the SOC design and adjusting the design accordingly.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

Figure 1:
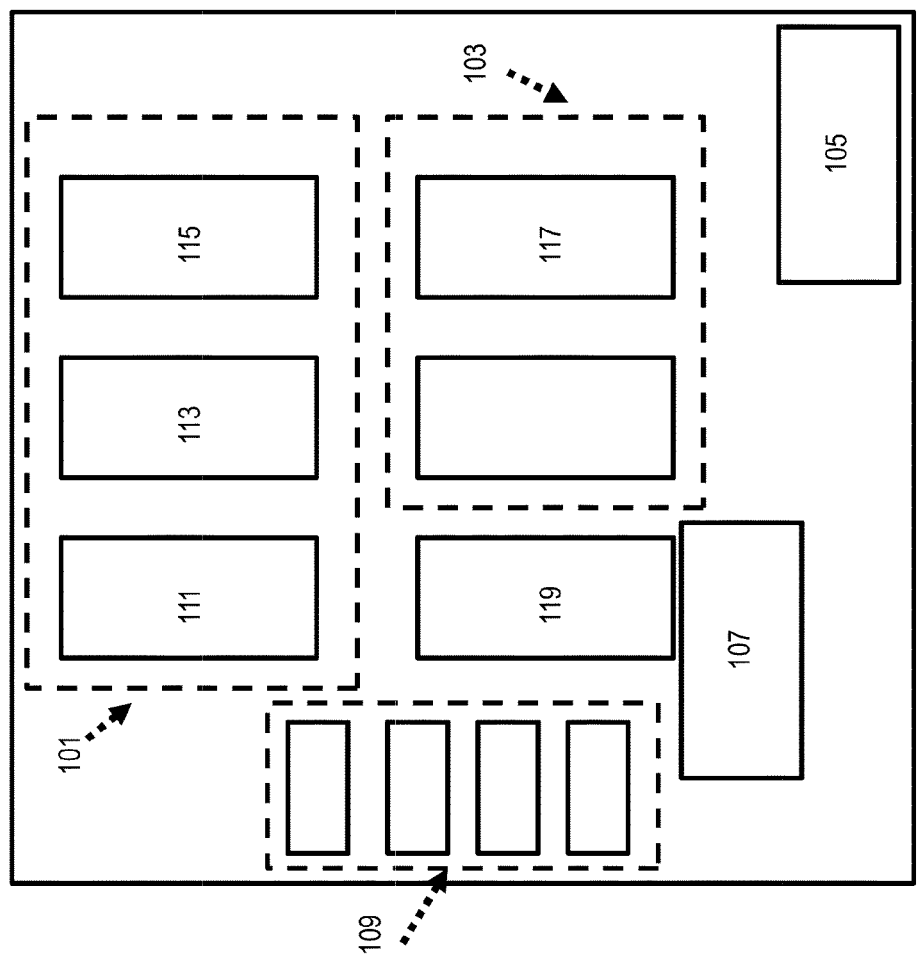
FIG. 1 schematically illustrates an SOC design without using a representation of an IP block topology before tape-out.
Figure 2:
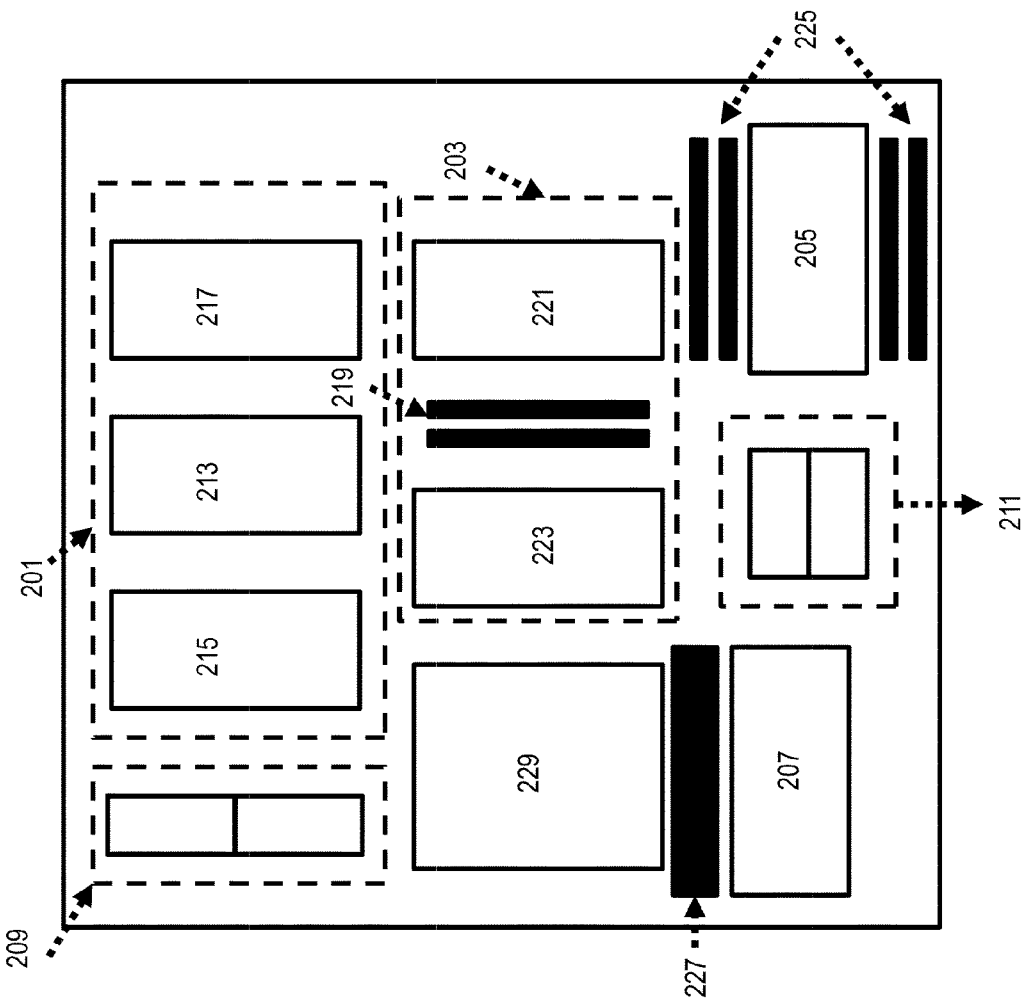
FIG. 2 schematically illustrates an SOC design using a representation of IP block topology before tape-out of the SOC, in accordance with an exemplary embodiment.

FIG. 2 schematically illustrates an SOC design using a representation of IP block topology before tape-out of the SOC. High material density IP blocks across the SOC core area can lead to high topology variation. Further, metal routing next to IP blocks leads to an undesirable increase in Cu (or Al) thickness of metal routing and an increase of topology variation of the SOC design. Additionally, topology variation near IP and logic block interfaces is significant as compared to the density variation within the logic area. Therefore, in accordance with an exemplary embodiment, before tape-out includes a floor planning design step, a placement and routing design step, an SOC design step, and a top level fill design step. As shown, a resulting SOC design may include a placement 201 of adjacent IP blocks with a gradual density increase, another placement 203 of adjacent IP blocks with a gradual density increase, a placement 205 of a high material density IP block with a gradual density increase, a placement 207 of an IP block that allows for a low thickness metal route, and a placement 209 and a placement 211 of IP blocks having an efficient floor plan. The metal route may, for example, be Cu, Al, or any other highly conductive material. The placement 201 of adjacent IP blocks has a gradual density increase because adjacent IP blocks include a medium material density IP block 213 between a low material density IP block 215, and a high material density block 217. In accordance with this disclosure, a high material density exceeds a density of 60%, a medium material density has a density of between 25% and 60%, a low material density is less than a density of 25%, and adjacent IP blocks are within 100 μm from each other. The surface topology height differences between adjacent IP blocks may be selected to be within 150 Å. It is contemplated that as technology advances IP block spacing will be reduced and the adjacent IP blocks surface topology height difference limits will be reduced. For instance, adjacent IP blocks surface topology height difference of 100 Å, 50 Å, 25 Å, and so forth may be considered as issues as devices continue to be scaled down in size. Additionally, the placement 203 of adjacent IP blocks has a gradual density increase because a wide width power preroute 219 separates a high material density IP block 221 from a low material density IP block 223. In addition, the placement 205 of an IP block includes a wide width power preroute 225 surrounding the IP block, which allows for a gradual density increase. Additionally, the placement 207 of an IP block includes a designated area 227 such as a dummy fill pattern or spacing between IP blocks, which allows for minimization of the Cu thickness and topology variation. Further, the placement 209 and the placement 211 of IP blocks have an efficient floor plan because the IP blocks are orientated edge to edge or side to side. Also, if, for example, the IP blocks in placement 209 and/or 211 have a high material density, placement 209 and/or 211 provides a better topology for later CMP processing. Additionally, to further reduce topology variation, a medium material density block 229 may be selected in place of a high material density IP block capable of performing a similar function.

Figure 3:
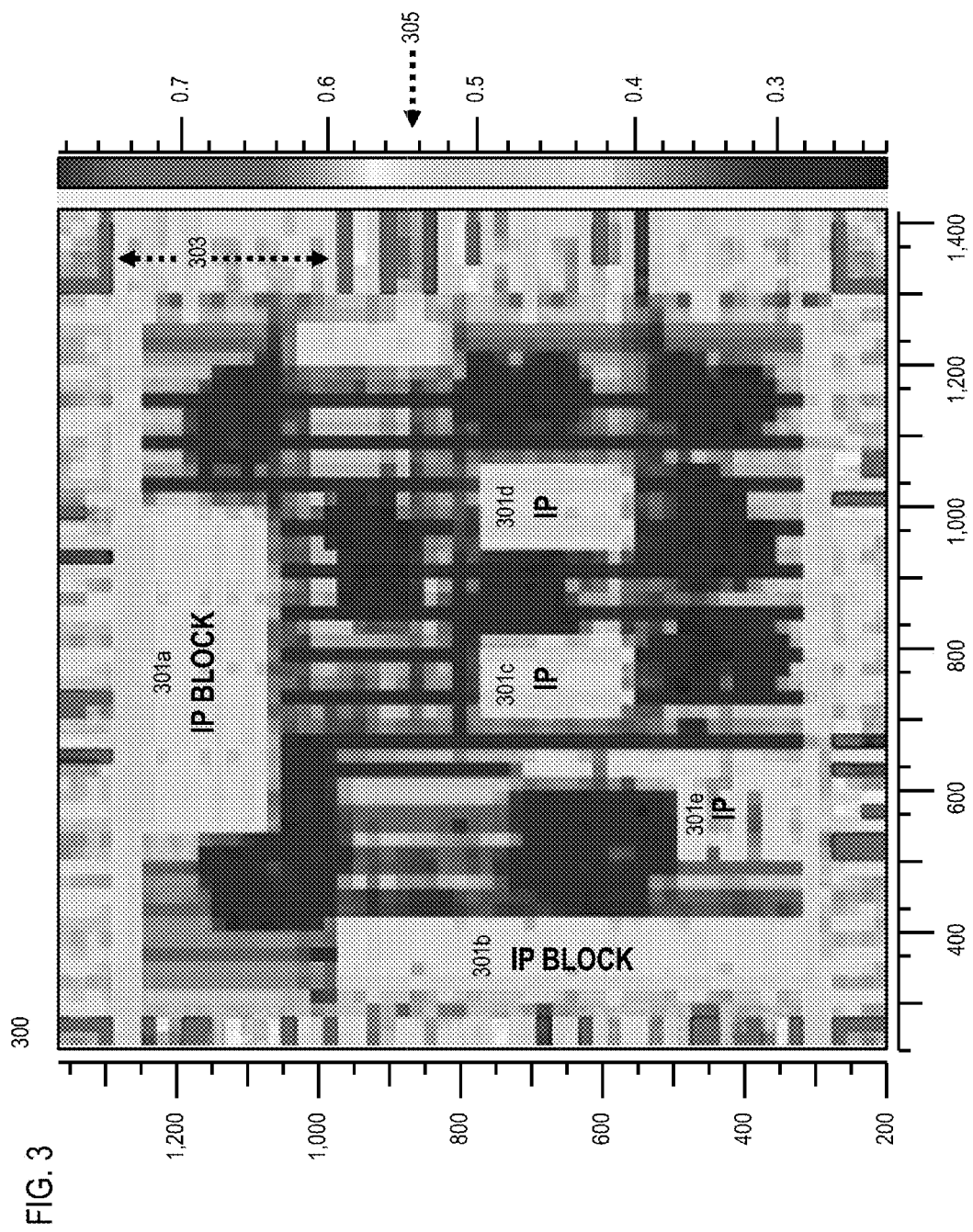
FIG. 3 illustrates a representation of density variation of an SOC design using a user interface, in accordance with an exemplary embodiment.

FIG. 3 illustrates a representation of density variation of an SOC design using a user interface. Such a topology density aware flow view should contain tile coordinates (in which a suggested tile size for model simulations is 20 μm by 20 μm), density, and surface height. As shown, the user interface includes a presentation 300 showing a placement of IP blocks 301a, 301b, 301c, 301d, and 301e having a medium material density and a placement of high material density areas 303. Additionally, the presentation 300 may include a key 305 that indicates a density.

Figure 4:
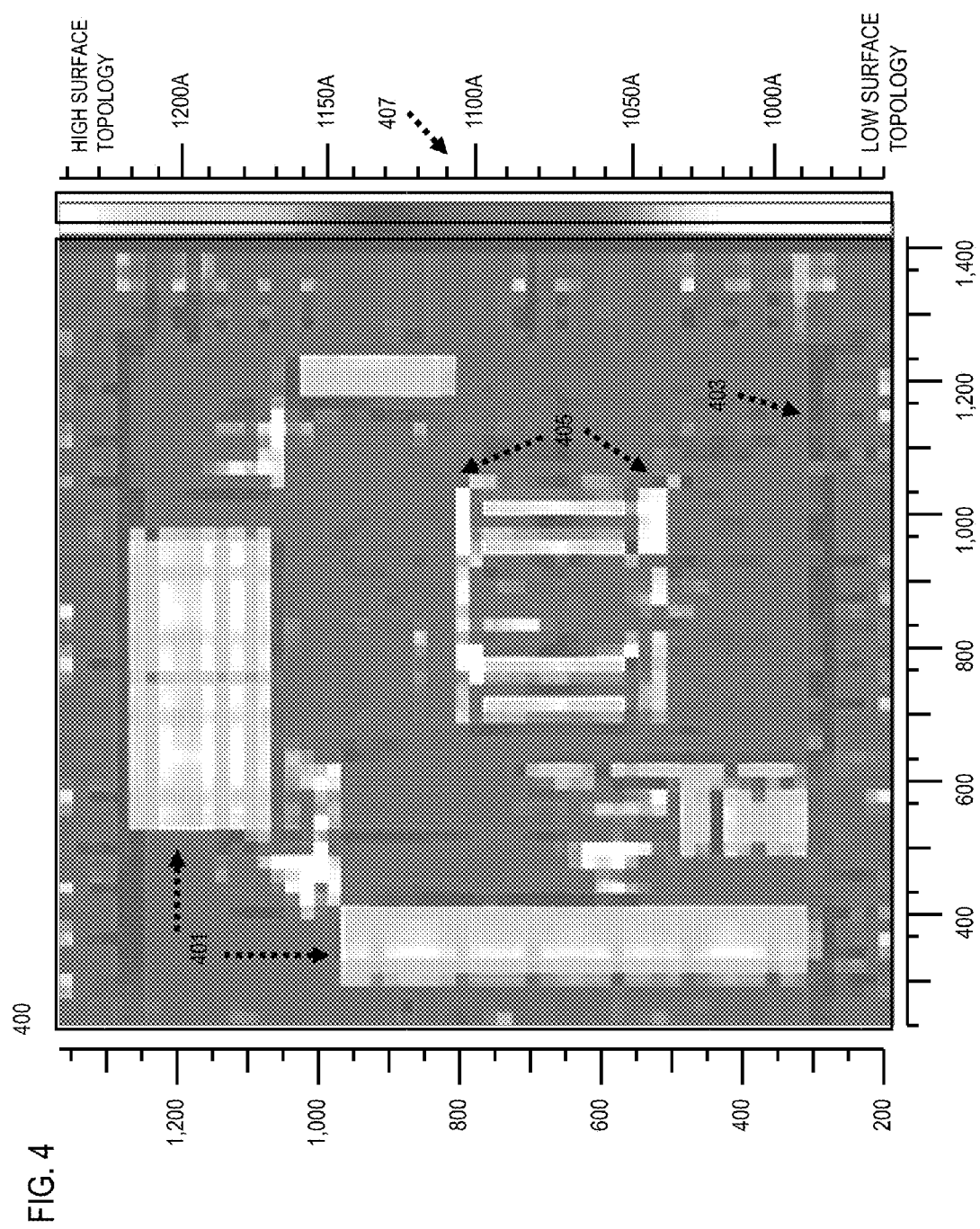
FIG. 4 illustrates a representation of surface topology variation of an SOC design using a user interface, in accordance with an exemplary embodiment.

FIG. 4 illustrates a representation of surface height topology of an SOC design using a user interface. As shown, the user interface includes a presentation 400 showing a placement of IP blocks 401 having a low surface topology, an area 403 having a higher surface topology, and metal routing area having a high surface topology 405. Additionally, the presentation 400 may include a key 407 that indicates a surface height topology.

The embodiments of the present disclosure can achieve several technical effects including a fabricated circuit with reduced CMP effects. The present disclosure enjoys industrial applicability in any SOC design, particularly in designs for manufacturing technologies 40 nm and below.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
   displaying a user interface;
   causing, at least in part, a presentation in the user interface of a surface height topology and/or material density view of a system on chip (SOC) design that includes an IP block;
   modifying, by a processor and prior to a tape-out of the SOC design, a surface height topology and/or material density transition for the IP block in the SOC design based on the presentation;
   indicating in the presentation a low material density for the IP block, a high material density for a second IP block of the SOC design, adjacent the IP block, and an intermediate density for a third IP block of the SOC design adjacent the second IP block and remote from the IP block; and
   modifying by placing the third IP block between the IP block and the second IP block, to reduce the density transition between the IP block and the second IP block, wherein a high material density exceeds a density of 60%, and a low material density is less than a density of 25%.

2. The method according to claim 1, comprising modifying during a floor planning design step, a placement and routing design step, an SOC design step, a top level fill design step, or a combination thereof.

3. The method according to claim 1, further comprising:
   indicating in the presentation a high material density for a fourth IP block; and
   modifying by surrounding the fourth IP block with a wide width power preroute, to reduce the density transition between the IP block and another IP block or a metal route.

4. The method according to claim 1, further comprising:
indicating in the presentation a high material density for a memory or another IP block of the SOC design; and
modifying by surrounding the memory or the another IP block with a wide width power preroute.

5. The method according to claim 1, wherein IP blocks within 100 microns (μm) from each other are adjacent, and wherein surface height topology height differences between the IP block and adjacent IP blocks are within 150 Angstroms (Å).

6. The method according to claim 1, wherein the IP block has a density and a surface height, the method further comprising:
indicating in the presentation another IP block with another density and another surface height configured to perform a similar function to the IP block; and
modifying by selecting, prior to a tape-out of the SOC design, the another IP block for the SOC design to perform the function when the another density is less than the density of the IP block, when the another surface height is less than the surface height of the IP block, or a combination thereof.

7. The method according to claim 1, comprising:
indicating in the presentation a first metal route for the IP block and a second metal route, different from the first, for a fourth IP block adjacent the IP block; and
modifying by forming a dummy fill pattern between the IP block and the fourth IP block to increase a metal surface planarity between the IP block and the second IP block.

8. The method according to claim 7, wherein the metal is copper (Cu) or aluminum (Al).

9. The method according to claim 1, further comprising:
indicating in the presentation a high material density for a fourth IP block and a high material density for a fifth IP block of the SOC design adjacent the fourth IP block; and
placing the fourth and fifth IP blocks edge to edge or side to side during a floor planning step.

10. A circuit comprising:
a plurality of IP blocks of a system on chip (SOC) design, each having a material density, a surface height, and tile coordinates, wherein a layout of the IP blocks is modified, prior to a tape-out of the SOC design, based on the material density, the surface height, or a combination thereof; and
a plurality of metal routes, each having a thickness, wherein the plurality of metal routes connect the plurality of IP blocks,
wherein the modified layout places IP blocks having a high material density adjacent to no other IP blocks having a low material density, and places IP blocks having a low material density adjacent to no other IP blocks having a high material density,
wherein the modified layout places IP blocks having an intermittent density between an IP block having a low material density and an IP block having a high material density, and
wherein IP blocks with a high material density have a density exceeding 60%, IP blocks with a low material density have a density less than 25%, IP blocks with an intermediate density have a density between 25% and 60%.

11. The circuit according to claim 10, wherein one or more preroute areas are designated in the layout, prior to a tape-out of the SOC design, for a placement of one or more of the plurality of metal routes, wherein the placement of the one or more of the plurality of metal routes spreads the plurality of metal routes or increases a metal thickness planarity of the SOC design.

12. The circuit according to claim 11, wherein each of the plurality of IP blocks is enclosed by a corresponding preroute area of the one or more preroute areas, and wherein the corresponding preroute area has a size based on the material density of the corresponding IP block the preroute area encloses.

13. The circuit according to claim 10, wherein the metal is copper (Cu) or aluminum (Al).

14. The circuit according to claim 10, wherein IP blocks within 100 microns (μm) from each other are adjacent, and wherein surface height topology height differences between adjacent IP blocks are within 150 Angstroms (Å).

15. A method comprising:
determining a system on chip (SOC) design with a plurality of IP blocks, each having a density, a surface height, and tile coordinates, and a plurality of copper (Cu) routes connecting the plurality of IP blocks, each having a thickness;
modifying, by a processor and prior to a tape-out of the SOC design, a layout of the plurality of IP blocks in the SOC design to have IP blocks with a density greater than 60% adjacent to no other IP blocks having a density less than 25%, and a placement of the plurality of IP blocks in the SOC design to have IP blocks with a density less than 25% adjacent to no other IP blocks having a density greater than 60%, wherein IP blocks within 100 microns (μm) from each other are adjacent, and wherein surface topology height differences between adjacent IP blocks are within 150 Angstroms (Å); and
designating, prior to a tape-out of the SOC design, an area around each of the plurality of IP blocks as a corresponding preroute area for a placement of one or more of the plurality of Cu routes, wherein the placement of the one or more of the plurality of Cu routes increases a Cu thickness planarity of the SOC design.

16. The method according to claim 15, further comprising determining a first IP block of the plurality of IP blocks configured to perform a function and at least one other IP block configured to perform the same function; and
selecting, prior to a tape-out of the SOC design, an IP block of the at least one other IP block having a lower density or a lower surface height than the first IP block.

17. The method according to claim 15, wherein the corresponding preroute area has a size based on the density of the corresponding IP block the preroute area encloses.

* * * * *